EXHAUST STACK FOR TILTING-CAB VEHICLES
Filed Feb. 13, 1958
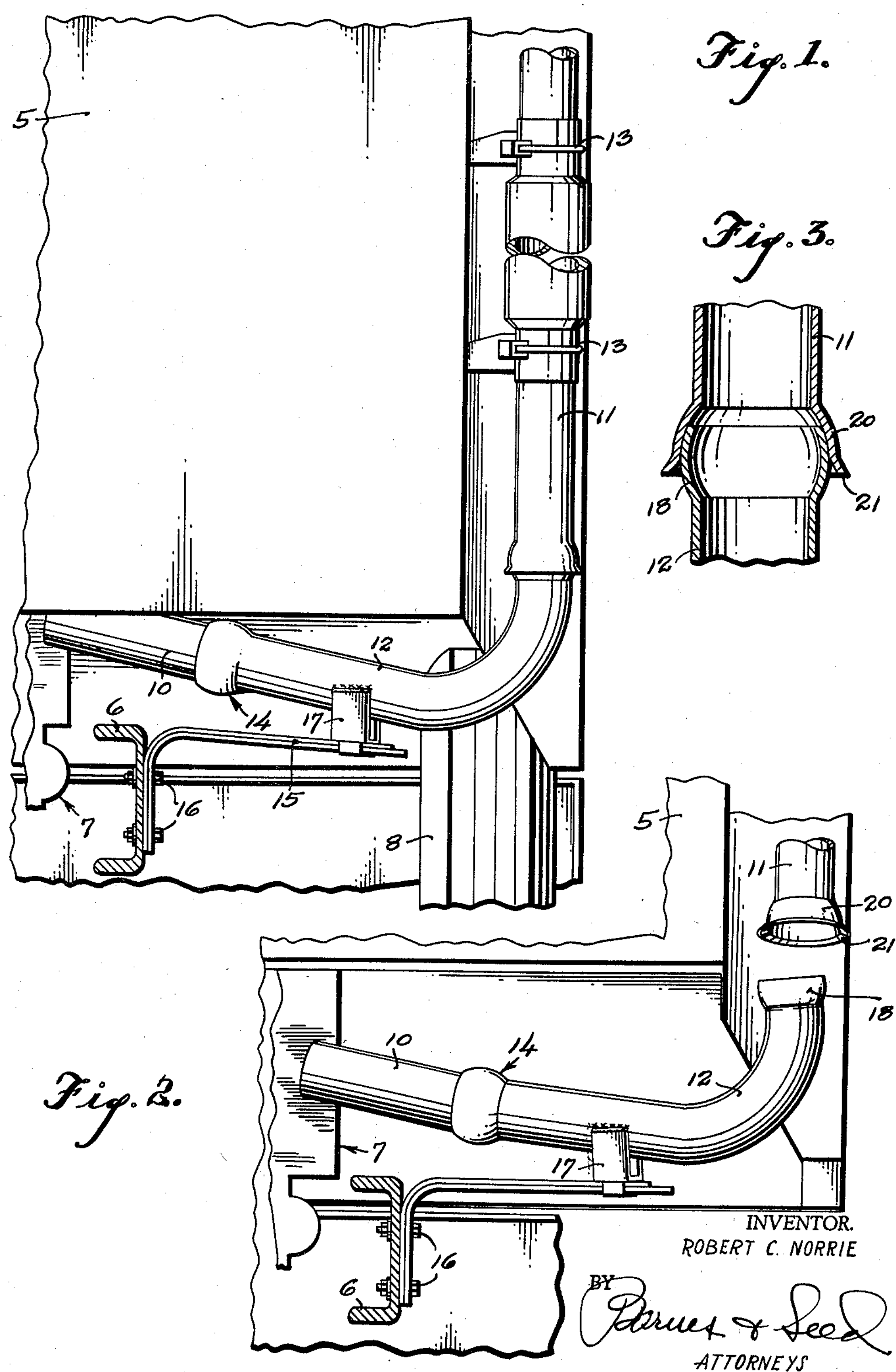

United States Patent Office 2,925,874

Patented Feb. 23, 1960

2,925,874

EXHAUST STACK FOR TILTING-CAB VEHICLES

Robert C. Norrie, Seattle, Wash., assignor to Pacific Car and Foundry Company, Seattle, Wash., a corporation of Washington Application February 13, 1958, Serial No. 715,093

11 Claims. (Cl. 180—64)

This invention relates to diesel-powered motor vehicles of the type in which the engine of the vehicle is located below the cab and the cab tilts forwardly to give access to the engine. Automotive vehicles powered by diesel fuel commonly expel their exhaust gases upwardly through a stack, and these stacks derive their support from the cab of the vehicle. It thus becomes necessary, in compensation of the relative movement between the cab and the vehicle chassis, that the stack be in separable sections, one section moving with the cab during tilting motion of the cab, while another section remains attached to the engine. It is perforce necessary that a tight joint be provided between the two sections and the arrangements heretofore provided have occasioned considerable time loss both in disconnecting the two sections preparatory to tilting the cab and in again connecting the sections after the cab has been lowered to its normal operating position.

As its general object the present invention aims to provide a motor vehicle of the character described embodying an exhaust stack composed of separable sections which are quickly disconnected and connected automatically as the cab of the vehicle is tilted forwardly from, and lowered to, a normal operating position, respectively.

This general object with other more particular objects and advantages responsible for producing a simple, inexpensive and unusually efficient stack arrangement for the purpose described will appear and be understood in the course of the following description and claims, the invention consisting in the novel construction and in the adaptation and combination of parts hereinafter described and claimed.

In the accompanying drawing:

Figure 1 is a fragmentary view looking forwardly from the rear of the vehicle cab to illustrate in elevation a tilting-cab vehicle having an exhaust stack constructed to embody the preferred teachings of the present invention. One of the two longitudinal channel principals of the vehicle frame is shown in section. As here represented the cab occupies the normal lowered position.

Fig. 2 is a fragmentary view taken from the same vantage point as Fig. 1 and illustrating the positions occupied by the cab, and the several sections of the exhaust stack, at the advent of an upward tilting motion of the cab; and Fig. 3 is an enlarged fragmentary vertical sectional view detailing the break-joint of the stack and showing the parts in their normal engaged position.

For a clear understanding of the present invention it is unnecessary that there be a detailed illustration of the chassis of the vehicle, or of the cab which it may be assumed is mounted thereon for forward tilting movement about a transverse horizontal axis located adjacent the front end of the chassis. It is to be understood that the exhaust stack to which the present invention pertains is applicable to any vehicle whose cab admits of being displaced vertically in relation to the chassis, whether such displacement is a tilting displacement in which the cab moves forwardly, rearwardly, or to either side, or simply lifts bodily.

In said drawing the numeral 5 denotes the cab, and 6 denotes one of the usual longitudinal channels of a vehicle frame giving support to an engine 7 which commonly underlies said cab. One of the vehicle's front wheels is represented by 8.

According to the present invention, in the preferred illustrated embodiment, the exhaust stack is composed of three sections 10, 11 and 12. Section 10, hereinafter termed the head section, extends more or less horizontally laterally from the engine and has its inner end rigidly connected to the exhaust manifold. The section 11 is fixed, as by shackles 13, alongside the outer wall of the cab and is disposed more or less vertically with its lower end located well beyond the outer end of the head section and somewhat above an axial prolongation of the latter. Section 11 will be hereinafter termed the tail section and is arranged to move bodily in concert with the tilting movement of the cab. The remaining section 12, hereinafter termed the coupling section, occupies an intervening position between the head and tail sections and has as its office to detachably connect these sections together. Section 12 has an elbow shape, and its connection with the head section is a permanent connection while its connection with the tail section is a quick-release make-and-break slip-fit connection.

Said permanent connection is comprised of a ball-and-socket joint 14 with the male and female components thereof being each carried as an integral terminal adjunct of the parent section, and namely the male component at a terminal adjunct of the head section and the female component as a terminal adjunct of the coupling section. The movement to which the coupling section's free end admits as it moves relative to the head section about the center of the ball joint as an axis is a simple wristing in that the coupling section is guidably held to swinging motion in a prescribed vertical path by the action of a cantilever-type leaf spring 15 bolted, as at 16, to the vehicle frame, the free end of such leaf spring being connected to a horizontal shank portion of the coupling section. The latter connection, as here shown, comprises a stirrup 17 sleeved upon tongue extremities of the leaf spring with yoking side arms of the stirrup welded to the coupling section.

The upwardly extending free end of the stack's coupling section is terminally formed with a substantial counterpart 18 of the male component of said ball joint 14. A female complement 20 of this male component 18 is provided upon the lower end of the tail section 11, but as distinguished from the ball joint 14 wherein the bell-shaped investment of the female component is spun over the male component so as to permanently grip the latter, said bell portion of the female component 20 extends only to a diameter of the hemispherical figure, thence expanding to produce a rather widely flared lead-in flange 21 encompassing the mouth.

As the female component 20 of the stack's tail section 11 moves upwardly upon forward tilting of the cab, and responsively breaks the joint between such tail section and the coupling section 12, the free end of the coupling section is elevated in a moderate degree by lift action of the cantilever spring 15, whereupon the coupling section is caused to occupy the position in which it is shown in Fig. 2. As the cab, upon returning to its normal operating position, approaches the low extreme of its reciprocal travel, the lower end of the stack's tail section 11 is brought into engagement with the moderately raised free end of the coupling section. The flared lead-in flange 21 then guides the male component 18 into its mating socket coincident with a forced depression of the free end of the coupling section 12 against the yielding restraint imposed by the cantilever spring 15. Such spring, now loaded, subjects the free end of the coupling section to a yielding lift force and thus firmly holds the male component 18 of the ball joint tightly seated within the mating socket of the female component 20, eliminating both rattles and gas leaks.

It is thought that the invention will have been clearly understood from the foregoing detailed description of my illustrated now preferred embodiment. Minor changes in the details of construction will suggest themselves and I accordingly intend that no limitations be implied and that the hereto annexed claims be given a scope fully commensurate with the broadest interpretation which the employed language fairly permits.

What I claim is:

1. In an automotive vehicle, in combination with a vehicle chassis supporting an engine, and a cab for the vehicle guidably mounted on said chassis for raising and lowering movement in an established path out of and into a normal operating position, an exhaust stack leading from the exhaust manifold of the engine and comprising at least two articulating sections one of which is carried by the chassis and the other of which is carried by the cab and characterized in that the meeting ends of said two articulating sections occupy a coinciding vertical axis when the cab is in its lowered normal position, separable interfitting means being provided in the articulation for breaking and making a gas-tight joint between the two sections automatically as the cab moves out of and into a normal operating position, respectively.

2. Structure according to claim 1 in which at least one of said articulating sections admits to a nominal degree of vertical flexure relative to the chassis or the cab, as the case may be, by which it is carried, and having means imposing a yielding force upon the said section acting to press the same against the other section when the two sections are brought together.

3. Structure according to claim 1 in which the separable interfitting means for producing said gas-tight joint comprises male and female components of a ball-and-socket connection having the ball below and the socket above and characterized in that the space bounded by the wall of the socket is substantially hemispherical.

4. Structure according to claim 3 having a widely flared flange substantially greater in circumference than the extreme outer diameter of the ball circumscribing the mouth of the socket to guide the ball into the socket as the cab lowers into its normal operating position.

5. In an automotive vehicle, in combination with a vehicle chassis supporting an engine, and a cab for the vehicle guidably mounted on said chassis for tilting movement in an established path out of and into a normal operating position, an exhaust stack for the engine comprising at least two sections one of which is carried by the chassis and leads laterally and thence upwardly from the engine and the other of which is carried by the cab and presents a lower end which in the normal lowered position of the cab occupies a vertical position coinciding axially with said upwardly directed end of the chassis-carried section, a slip-fit connection being provided between said axially coinciding ends of the sections acting to break and make a gas-tight joint automatically in response to tilting movement of the cab out of and into a normal operating position, respectively.

6. An automotive vehicle according to claim 5 characterized in that said upwardly directed end of the chassis-carried section of said exhaust stack admits to a nominal degree of vertical flexure relative to the chassis, and having means imposing a yielding lift force upon said upwardly directed end.

7. Structure according to claim 6 in which the gas-tight joint comprises a ball-shaped terminal provided by the chassis-carried section and a mating socket presented by the cab-carried section and characterized in that the space bounded by the ball-investing wall of the socket is substantially hemispherical.

8. In an automotive vehicle, in combination with a vehicle chassis supporting an engine, and a cab for the vehicle mounted on said chassis for tilting movement about a transverse horizontal axis out of and into a normal operating position, a multi-section exhaust stack for the engine, said stack comprising a head section which extends laterally from the engine and articulates by a gas-tight ball-and-socket joint with a second elbow-shaped section which extends laterally and thence upwardly from the first said section and articulates in turn by a gas-tight ball-and-socket joint with an upwardly extending tail section, the ball component of said joints being in each instance located at the aft end of the concerned stack section, the socket of the first-named joint being spun over the concerned ball to permanently invest the latter while that of the second-named joint is substantially hemispherical to permit the ball to slip out of and into the socket as the cab tilts upwardly and returns downwardly to its normal operation position, and means acting to exert a yielding upward force upon the elbow-shaped section for pressing the ball end of the same into the mating socket of the tail section.

9. The vehicle of claim 8 in which the means last recited comprises a cantilever spring bolted to the chassis of the vehicle in a position sustaining said elbow-shaped section and attached to the latter to serve the added function of guiding the elbow-shaped section so that the latter is restrained to swing in an established vertical path about its inner end as an axis.

10. Structure according to claim 9 in which the socket of the tail section has a flared flange circumscribing the mouth of the socket to guide the ball complement of said socket into the socket as the cab lowers into its normal operating position.

11. In an automotive vehicle, in combination with a vehicle chassis supporting an engine, and a cab for the vehicle guidably mounted on said chassis for raising and lowering movement in an established path out of and into a normal operating position, a plural-section exhaust stack including an elbow-shaped section fed with exhaust gases from the engine and carried by the chassis so as to extend laterally and thence upwardly and characterized in that said upwardly extending portion articulates by a gas-tight slip joint with an inner vertically disposed end of a tail section carried by the cab, said elbow section being flexibly associated with the chassis in order that its said articulating end may move vertically relative to the chassis in a moderate degree, and a spring leaf bolted to the chassis of the vehicle and so associated with the elbow section that it locates the articulating end thereof in a position to properly register with the tail section when the two sections are brought into engagement upon a lowering of the cab and exerts upon the elbow section an upward force yieldingly pressing the articulating end against the tail section.

References Cited in the file of this patent

UNITED STATES PATENTS

| | | |
|---|---|---|
| 2,020,054 | Ford | Nov. 5, 1935 |
| 2,078,420 | Sheldrick | Apr. 27, 1937 |
| 2,295,907 | Lewis | Sept. 15, 1942 |
| 2,699,223 | Brumbaugh | Jan. 11, 1955 |
| 2,841,232 | Loeffler | July 1, 1958 |

FOREIGN PATENTS

| | | |
|---|---|---|
| 424,469 | Great Britain | Feb. 21, 1935 |